US007383194B2

(12) United States Patent
Heiden et al.

(10) Patent No.: US 7,383,194 B2
(45) **Date of Patent: *Jun. 3, 2008**

(54) SOFTWARE BASED STAMP DISPENSER

(75) Inventors: Gary M. Heiden, Shelton, CT (US); Richard W. Heiden, Huntington, CT (US); Chunhua Li, North Haven, CT (US)

(73) Assignee: Pitney Bowes Inc., Stamford, CT (US)

(*) Notice: Subject to any disclaimer, the term of this patent is extended or adjusted under 35 U.S.C. 154(b) by 1303 days.

This patent is subject to a terminal disclaimer.

(21) Appl. No.: 10/094,855

(22) Filed: Mar. 12, 2002

(65) Prior Publication Data

US 2002/0091545 A1 Jul. 11, 2002

Related U.S. Application Data

(63) Continuation of application No. 09/474,510, filed on Dec. 29, 1999, now Pat. No. 6,438,530.

(51) Int. Cl.

*G06Q 10/00* (2006.01)
*G06Q 30/00* (2006.01)
*G06F 17/00* (2006.01)
*G07B 17/02* (2006.01)

(52) U.S. Cl. .......................................... 705/1; 705/401

(58) Field of Classification Search .................. 705/60, 705/62, 401, 408, 410, 1
See application file for complete search history.

(56) References Cited

U.S. PATENT DOCUMENTS 4,725,718 A 2/1988 Sansone et al. ............. 235/495
4,757,537 A 7/1988 Edelmann et al. ............ 380/51
4,775,246 A 10/1988 Edelmann et al. ............ 705/62
4,802,218 A 1/1989 Wright et al. ................. 705/60
4,831,555 A 5/1989 Sansone et al. ............ 358/1.14

(Continued)

FOREIGN PATENT DOCUMENTS

JP 11-328462 A 11/1999

OTHER PUBLICATIONS

McNamara: "E-Stamp No lick, no stick, just click;" Network World, Apr. 6, 1998, vol. 15, No. 14, p. 10.

(Continued)

*Primary Examiner*—John W Hayes
*Assistant Examiner*—Fadey S Jabr
(74) *Attorney, Agent, or Firm*—Brian A. Lemm; Angelo N. Chaclas

(57) ABSTRACT

A system for generating digital postage stamps wherein a PC requests digital postage stamps from a data center. The data center generates a digital book of postage stamps, which the PC downloads to its hard drive. The digital book of postage stamps includes a read-only software module that prints each digital postage stamp using stamp related information contained within the software module. The software module on the PC verifies that the signature of the PC is identical to the PC signature that was stored in the software module when the software module was configured at the data center. If verified, the software module generates the digital postage stamp and then initiates printing on a printer coupled to the PC. The software module renders the data associated with the digital postage stamp being printed unusable for subsequent generations of digital postage stamps.

20 Claims, 6 Drawing Sheets

U.S. PATENT DOCUMENTS

| | | | | |
|---|---|---|---|---|
| 4,873,645 | A | 10/1989 | Hunter et al. | 700/231 |
| 5,454,038 | A | 9/1995 | Cordery et al. | 705/60 |
| 5,509,109 | A | 4/1996 | Kim et al. | 358/1.15 |
| 5,510,992 | A * | 4/1996 | Kara | 705/408 |
| 5,655,023 | A | 8/1997 | Cordery et al. | 380/51 |
| 5,987,441 | A | 11/1999 | Lee et al. | 705/401 |
| 6,098,058 | A * | 8/2000 | Gravell et al. | 705/410 |
| 6,141,654 | A | 10/2000 | Heiden et al. | 705/408 |
| 6,244,763 | B1 * | 6/2001 | Miller | 400/76 |
| 6,249,777 | B1 * | 6/2001 | Kara et al. | 705/404 |
| 6,438,530 | B1 * | 8/2002 | Heiden et al. | 705/401 |
| 6,463,473 | B1 * | 10/2002 | Gubbi | 709/225 |

OTHER PUBLICATIONS

The United States Postal Service (USPS): "Information-Based Indicia Program (IBIP) Performance Criteria for Information-Based Indicia and Security Architecture for Open IBI Postage Metering Systems (PCIBI-O);" Apr. 26, 1999.

* cited by examiner

SOFTWARE BASED STAMP DISPENSER

This application is a continuation of application Ser. No. 09/474,510, filed Dec. 29, 1999, now U.S. Pat. No. 6,438, 530, which is hereby incorporated by reference.

FIELD OF THE INVENTION

The invention disclosed herein relates generally to systems and methods for evidencing postage payment, and more particularly to systems and methods for evidencing postage payment using a personal computer.

BACKGROUND OF THE INVENTION

Postage metering systems have been developed which employ encrypted information that is printed on a mailpiece as part of an indicium evidencing postage payment. The encrypted information includes a postage value for the mailpiece combined with other postal data that relate to the mailpiece and the postage meter printing the indicium. The encrypted information, typically referred to as a digital token or a digital signature, authenticates and protects the integrity of information, including the postage value, imprinted on the mailpiece for later verification of postage payment. Since the digital token incorporates encrypted information relating to the evidencing of postage payment, altering the printed information in an indicium is detectable by standard verification procedures. Examples of systems that generate and print such indicium are described in U.S. Pat. Nos. 4,725, 718, 4,757,537, 4,775,246 and 4,873,645, each assigned to the assignee of the present invention.

Presently, there are two postage metering device types: closed system and open system. In a closed system, the system functionality is solely dedicated to metering activity. Examples of closed system metering devices, also referred to as postage evidencing devices, include conventional digital and analog (mechanical and electronic) postage meters wherein a dedicated printer is securely coupled to a metering or accounting function. Typically, in a closed system, the printer is securely coupled and dedicated to the meter, and printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multiuser applications and digital printers. An open system metering device is a postage evidencing device with a non-dedicated printer that is not securely coupled to a secure accounting module. An open system indicium printed by the non-dedicated printer is made secure by including addressee information in the encrypted evidence of postage printed on the mailpiece for subsequent verification. See U.S. Pat. Nos. 4,725,718 and 4,831,555, each assigned to the assignee of the present invention.

Recently, the United States Postal Service ("USPS") has approved personal computer (PC) postage metering systems as part of the USPS Information-Based Indicia Program ("IBIP"). The IBIP is a distributed trusted system which is a PC based metering system that is meant to augment existing postage meters using new evidence of postage payment known as information-based indicia. The program relies on digital signature techniques to produce for each mailpiece an indicium whose origin can be authenticated and content cannot be modified. The IBIP requires printing a large, high density, two-dimensional ("2-D") bar code on a mailpiece. The 2-D bar code, which encodes information, is signed with a digital signature. A description of the IBIP PERFORMANCE CRITERIA FOR INFORMATION-BASED INDICIA AND SECURITY ARCHITECTURE FOR OPEN IBI POSTAGE METERING SYSTEMS (PCIBI-O), a published draft specification dated Apr. 26, 1999, which is referred to herein as the "IBIP Specification". The IBIP Specification defines the proposed requirements for a new indicium that will be applied to mail being created using IBIP, defines the proposed requirements for a Postal Security Device ("PSD"), which is a secure processor-based accounting device that is couple to a personal computer to dispense and account for postal value stored therein to support the creation of a new "information-based" postage postmark or indicium that will be applied to mail being processed using IBIP, and defines the proposed requirements for a host system element (personal computer) of IBIP.

The IBIP Specification defines a stand-alone open metering system, referred to herein as a PC Meter, comprising a PSD coupled to a PC, which operates as a host system with a printer coupled thereto. The PC runs the metering application software and associated libraries and communicates with the attached PSD. The PC Meter processes transactions for dispensing postage, registration and refill on the PC. Meter processing is performed locally between the PC and the PSD coupled thereto. Connections to a Data Center, for example for registration and refill transactions, are made locally from the PC through a local or network modem/internet connection. Accounting for debits and credits to the PSD is also performed locally, logging the transactions on the PC. Several application programs running on the PC, such as a word processor or an envelope designer, may access the metering application software. At the present, the USPS has approved for one PC Meter product E-Stamp® Internet Postage which is distributed by E-Stamp Corporation of Houston, Tex. Other PC meter products are currently in beta test with the USPS.

The USPS has approved an alternative version of the PC Meter in which the PSD function is performed at a server that is remote from the PC and accessible through the Internet. This alternative version, which is referred to herein as a "virtual meter", is a network metering system, has many client PCs without any PSDs coupled thereto. The client PCs run application software for requesting and formatting postage indicia, but all PSD functions are performed on server(s) located at a Data Center. The PSD functions at the Data Center may be performed in a secure device attached to a computer at the Data Center, or may be performed in the Data Center computer itself. The client PCs must connect with the Data Center to process transactions such as postage dispensing, meter registration, or meter refills. Transactions are requested by the client PC and sent to the Data Center for remote processing. The transactions are processed at the Data Center and the results are returned to the client PC. Accounting for funds and transaction processing are centralized at the Data Center. See, for example, U.S. Pat. Nos. 5,454,038 and 4,873,645, which are assigned to the assignee of the present invention.

The virtual meter does not conform to all the current requirements of the IBIP Specifications. In particular, the IBIP Specifications do not permit PSD functions to be performed at the Data Center. However, it is understood that a virtual meter configuration with each mailer's PSD located at the Data Center may provide an equivalent level of security as required by the IBIP Specifications.

In conventional closed system mechanical and electronic postage meters, a secure link is required between printing and accounting functions. For postage meters configured with printing and accounting functions performed in a single, secure box, the integrity of the secure box is monitored by periodic inspections of the meters. More recently, digital printing postage meters typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point-to-point communication link between the PSD and print head. See, for example, U.S. Pat. No. 4,802,218, issued to Christopher B. Wright et al. and now assigned to the assignee of the present invention. An example of a digital printing postage meter with secure print head communication is the Personal Post Office™ manufactured by Pitney Bowes Inc. of Stamford, Conn.

Although the IBIP provides a viable system and method for printing postage on a PC, there are requirements inherent in the IBIP that limit the desirability for use by small office home office users whose use of the PC metering may not include mailing in a volume sufficient to warrant costs above and beyond the costs of stamps purchase from the Post Office. For example, non-business users may balk at the additional cost associated with requiring the rental of a PSD or the administrative cost for maintaining an account at a Data Center. For the virtual meter, in addition to the cost, non-business users may balk at the need to connect to the Internet every time postage is needed.

At the present, the IBIP includes sampling verification, which is not a reliable method for detecting fraud. A more robust verification system must be implemented. A key component of any verification system for the IBIP is verification that addressee information contained in the 2-D bar code of the indicium is matched to addressee information contained in the addressee block of the mailpiece or in the postnet bar code on the mailpiece. It is not clear at this time how soon a reliable verification system will be in place to verify the volume of mailpieces that are produced by an IBIP PC meter. This problem is accentuated by the fact that IBIP verification of open system indicia, which includes verifying correct addressee information is in the indicia, must take place at the same time that verification of closed system indicia, which does not have addressee information in the indicia, is also being performed. The total verification process is even more complicated considering that there are different indicia created by traditional flatbed (i.e. non-digital) printer meters and digital printer meters.

SUMMARY OF THE INVENTION

The present invention provides an alternative to the IBIP scheme for PC postage. It has been found that a digital "book of stamps" can be purchased electronically over the Internet. The digital book of stamps is a self-executing software module that is configured to run only on one PC. The user purchases digital postage over the Internet in a manner comparable to purchasing a book of stamps from the post office. The digital postage can be for one or more denominations. Each digital postage stamp that is printed on a mailpiece is verifiable and can be identified as being printed by a particular software module that has been run on a particular PC. In the present invention, a digital postage stamp does not include any addressee information. Therefore, any digital postage stamp can be used as postage payment evidence on any mailpiece, i.e., just as a conventional postage stamp.

In accordance with the present invention, verifiable digital postage may be printed by a non-dedicated printer coupled to a PC wherein such digital postage does not include addressee information. Thus, purchasing postage value over, for example, the Internet, is akin to purchasing a book of stamps at the Post Office. Unlike the information-based indicium that requires addressee information, the present invention provides that each digital stamp printed by the PC can be used on any mailpiece. It has been found, however, that some form of encoded addressee information may be printed with the digital postage stamp to improve the verification process, but this does not restrict a particular digital postage stamp to a particular mailpiece.

A first embodiment provides a system and method for purchasing a book of digital stamps of fixed denomination over the Internet. The book of digital stamps comprises a software module that runs only on the PC from which the request for postage originates and to which the book of stamps is downloaded. The book of stamps is a software module that is created at the data center server for generating digital stamps only in the PC that initiated the purchase of the book of stamps. The software module comprises stamp data needed to generate each stamp, and algorithms for generating each of the digital stamps from the stamp data. Once all of the digital stamps have been printed, the stamp software module preferably uninstalls itself automatically after notifying the user that the book of stamps is empty. For purposes of security and control, the book of stamps can be programmed with a time limit for using the stamps.

In an alternative embodiment, the data center server generates the bitmap of the each stamp in the book of stamps and the bitmaps of the stamps are included with the software module, which further comprises algorithms for printing the stamps.

In yet another embodiment, the user purchases a book of stamps of no predetermined denomination, i.e. a total value of postage. The digital stamp software module then includes a user interface whereby the user selects the denomination for each stamp to be printed up to the unused amount of the book of stamps.

In accordance with the present invention, the data center is not required to maintain a user account for the prepayment or post-payment of postage value. Digital postage stamps are purchase over the Internet through conventional Internet transaction methods, such as by credit card. Thus, the present invention provides a method of purchasing digital postage stamps over the Internet in the same manner as one would purchase a book of stamps at the Post Office. It will be understood that under the present invention, the user may have more than one book of stamps stored on the PC. For example, the user may have a book of 33 cent digital stamps and a book of twenty cent digital stamps.

In accordance with the preferred embodiment of the present invention, a method for generating digital postage stamps provides a data center receiving a request from a PC for a selected number of digital postage stamps, concluding a payment transaction for the selected number of digital postage stamps, and generating a digital book of postage stamps, which the PC downloads to its hard drive. The digital book of postage stamps includes a read-only software module that generates and prints each digital postage stamp using stamp related information contained within the software module. The stamp related information includes stamp information that is required for each postage stamp, user information that identifies the requestor and the PC, data center server information that is unique to each digital postage stamp and a digital signature of at least some of the user, stamp and/or server information. Before printing a digital postage stamp, the software module on the PC verifies that the signature of the PC is identical to the PC signature that was stored in the software module when the software module was configured at the data center server. If verified, the software module generates the digital postage stamp using the stamp, user and server data associated with the digital postage stamp and then initiates the printing of the digital postage stamp on a printer coupled to the PC. The software module renders the stamp, user and server data associated with the digital postage stamp being printed unusable for subsequent generations of digital postage stamps. When all stamps of the book of stamps have been printed, the software module uninstalls itself.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PRESENT INVENTION

Figure 1:
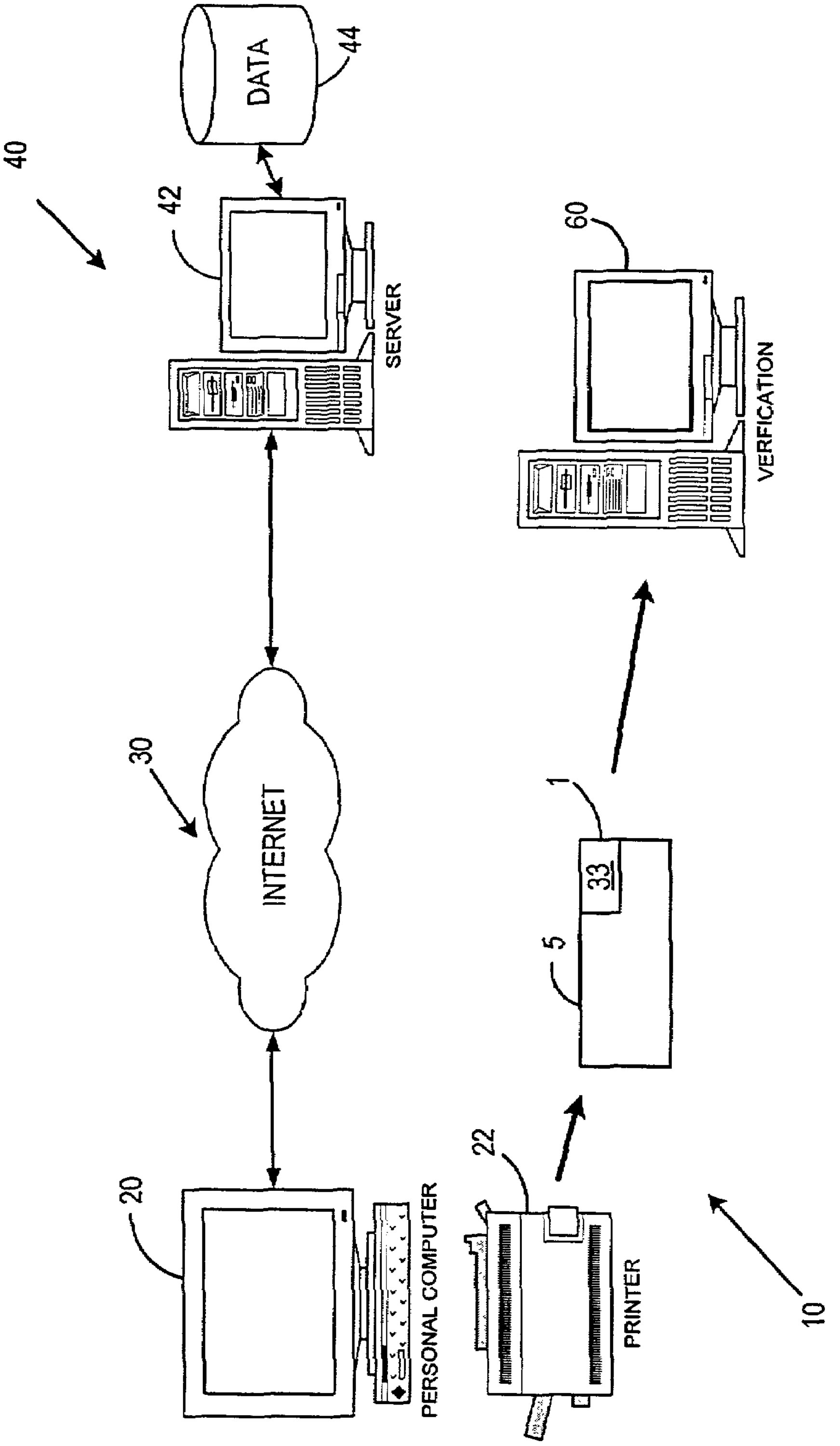
FIG. 1 is a block diagram of a postage metering system in accordance with the present invention.

In describing the present invention, reference is made to the drawings, wherein there is seen in FIG. 1 a block diagram of a postage metering system, generally designated 10, which is representative of a system in which the present invention is implemented. Postage metering system 10 includes a plurality of personal computers (PC) 20 (only one is shown) that are communicatively connected to a server 42 at a remote Data Center 40. It will be understood that PCs 20 may be connected to server 42 using various conventional methods, such as through a local or network modem/internet 30 connection. PC 20 has a printer 22 connected thereto for printing postage revenue block 1 on a mailpiece 5. Server 42 has access to a database 44, which includes information needed to Data Center 40 to distribute digital books of postage stamps in the manner described below. Finally, Postage metering system 10 includes a verification subsystem 60 that is used to verify a subset or all of the mailpieces 5 on which a digital postage stamp is printed as evidence of postage payment.

Figure 2:
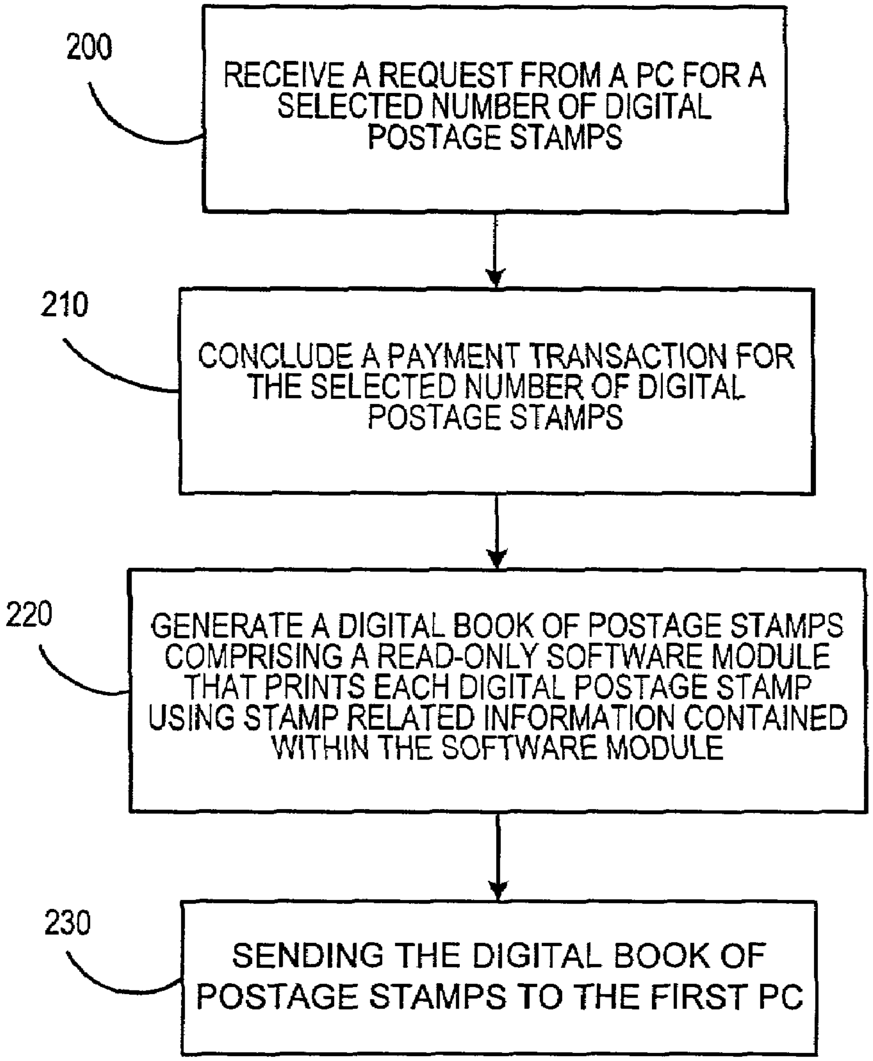
FIG. 2 is a flow chart of the preferred embodiment of a data center process for responding to a request from a PC for a software module containing a digital book of postage stamps in the postage metering system of FIG. 1.

Referring now to FIG. 2, a data center process is shown for responding to a request from a PC a software module containing a digital book of postage stamps. At step 200, the data center receives a request from a PC for a selected number of digital postage stamps. The request includes user data, such as PC signature (described below) and an identification number, which is obtained during a one-time registration for the purchase of stamps over the Internet. The request also includes stamp data, such as origin zip code of the PC, denomination of the postage stamps and date of the request. At step 210, a payment transaction for the selected number of digital postage stamps is concluded. The payment transaction preferably is a credit card transaction, but may be a pre-established credit/debit account as used with conventional postage meters. At step 220, the server in the data center generates a digital book of postage stamps comprising a read-only software module that prints each digital postage stamp of the digital book of postage stamps using stamp related information contained within the software module. The stamp related information includes the user data and stamp data that was received with the request from the PC, and further includes server data, such as identification of the server generating the digital book of stamps, status of the server and a number corresponding to a sequential number of digital postage stamps generated by the server. The stamp related information further includes a digital signature of at least some of the user, stamp and/or server information. The software module also includes the number of digital postage stamps in the digital book of postage stamps. The software module is generated to be executable only on the PC that has initiated the request for the digital book of postage stamps. This prevents the fraudulent copying of the software module for use on another PC.

In the preferred embodiment of the present invention, the data center does not generate the graphical image of each digital stamp, but stores the information needed for the software module to generate the graphical image of the digital stamp at the PC when the digital stamp is printed. This embodiment is preferred because size of the software module is significantly smaller if the graphical images are generated at the PC, thus reducing the time needed to download the software module electronically. However, a viable, alternative embodiment is one in which the graphical image of each digital stamp is generated and made part of the software module by the data center. A more detailed description of the digital book of postage stamps, including the information required to generate the stamps, is provided below. At step 230, the server in the data center sends the digital book of postage stamps to the requesting PC.

Figure 3:
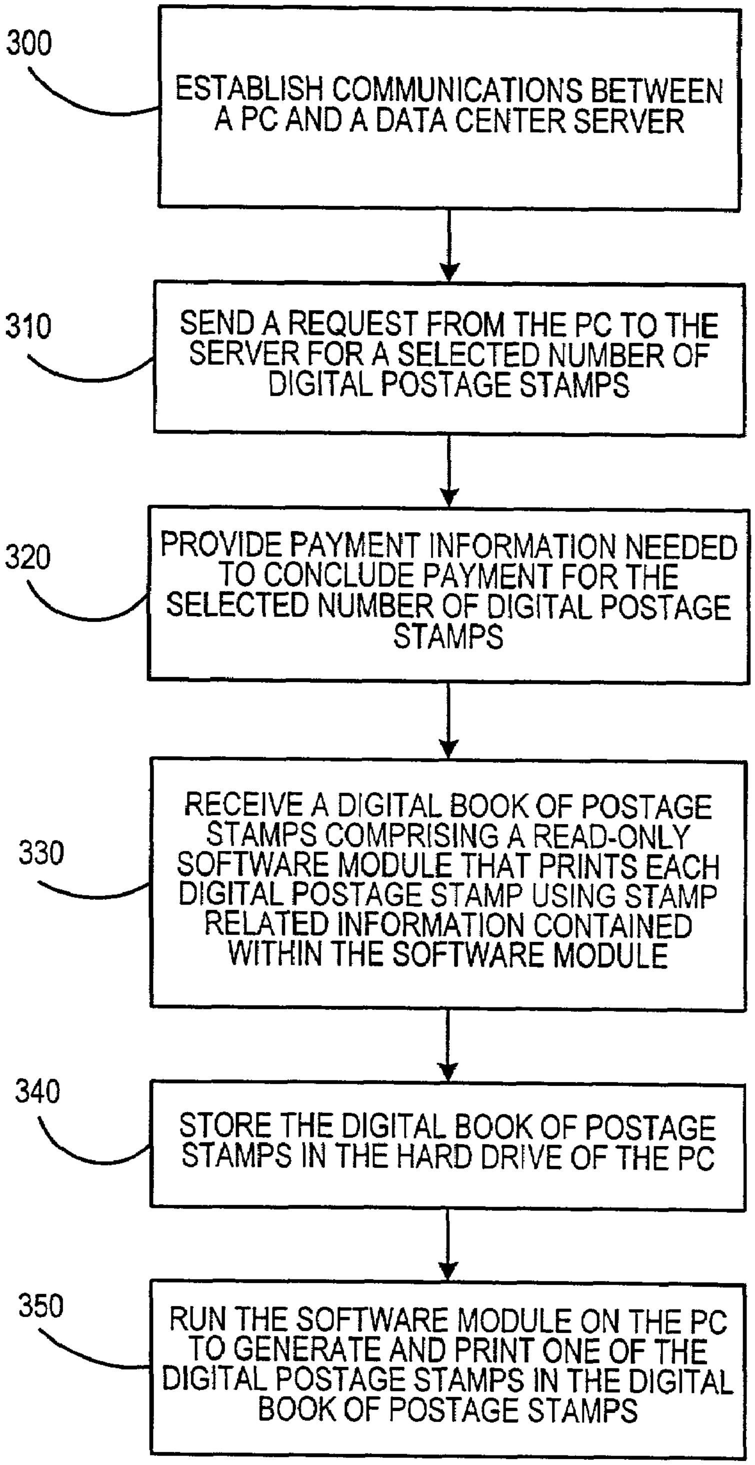
FIG. 3 is a flow chart of a PC requesting, obtaining and printing one of the stamps in the digital book of postage stamps generated in FIG. 2.

Referring now to FIG. 3, the process is shown of a PC requesting, obtaining and using the digital book of postage stamps received from the data center. At step 300, communications is established between a PC and a data center server. When communications are established over the Internet 30, preferably a conventional secure channel such as SSL should be used. At step 310, a request is sent from the PC to the server for a selected number of digital postage stamps. At step 320, the PC provides to the server in the data center payment information needed to conclude payment for the selected number of digital postage stamps. At step 330, the PC receives a digital book of postage stamps comprising a read-only software module that generates and prints each digital postage stamp using stamp related information contained within the software module. At step 340, the PC stores the digital book of postage stamps in the hard drive of the PC. At step 350, a user runs the software module on the PC to generate and print one of the digital postage stamps in the digital book of postage stamps. As noted above, in an alternative embodiment the graphical image of each digital postage stamp is stored as part of the software module, such that the software module does not generate the graphical image before printing.

Figure 4:
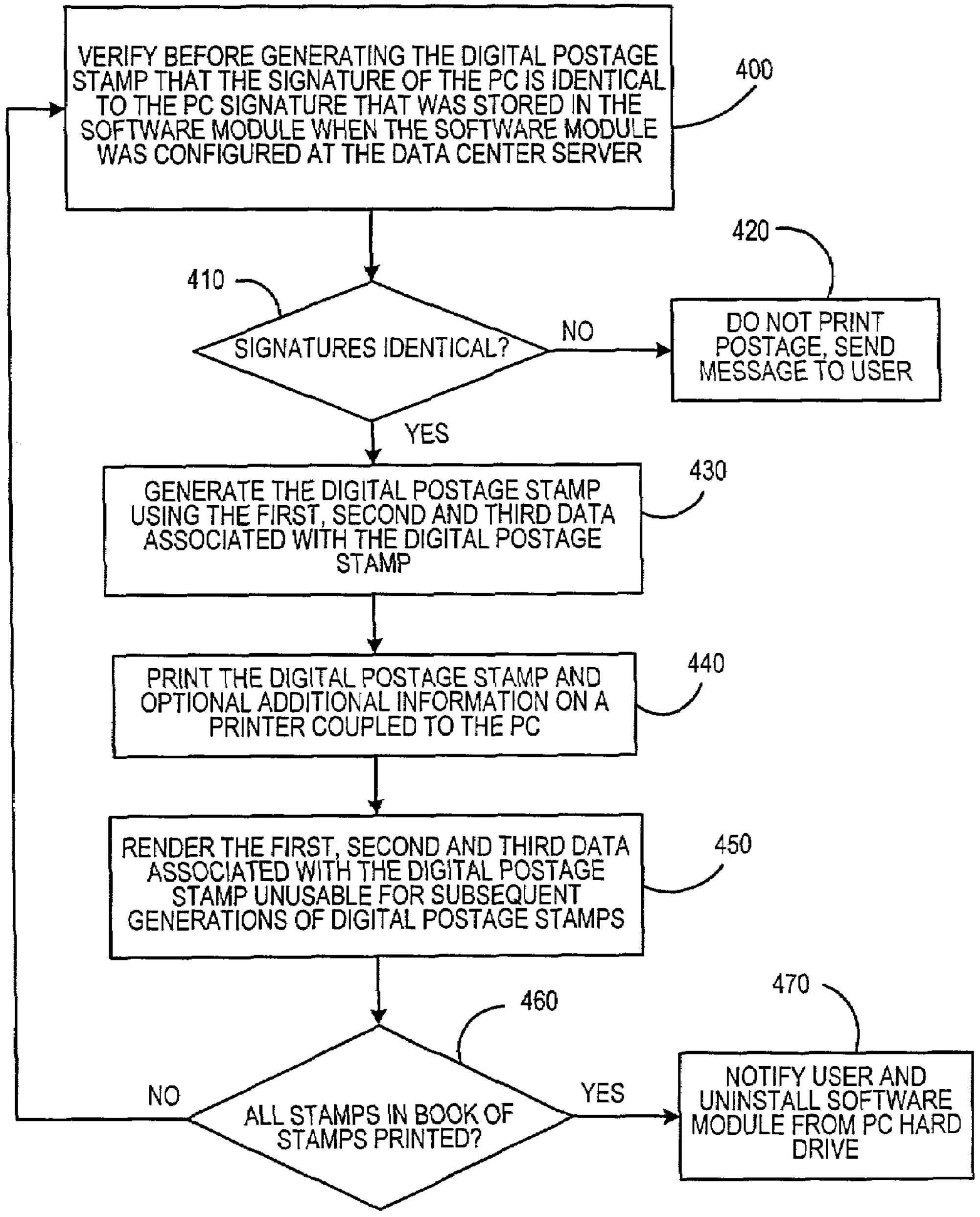
FIG. 4 is a flow chart of the preferred embodiment of the PC generating a digital postage stamp from the digital book of postage stamps.

Referring now to FIG. 4, the preferred embodiment is shown for the PC generating digital postage stamps from the digital book of postage stamps. At step 400, the software module verifies before generating the book of digital postage stamps that the signature of the PC in which the software module is running is identical to the PC signature that was stored in the software module when the software module was configured at the data center server. This verification provides a level of security, which prevents the software module, i.e. the digital book of postage stamps from being used on another computer. Once downloaded to a specific PC, the software module cannot be copied for use on another PC, thus preventing fraudulent copies from being distributed for repetitive printing of each of the digital stamps.

One example of a PC signature is the Processor serial number (PSN) in the Pentium® III Processors manufactured by Intel Corporation of Santa Clara, Calif. The PSN feature is embedded into the chip during the manufacturing process of the Pentium® III processor. The PSN serves as an identifier for the processor, and, by association, its system. Like the serial numbers on many other electronic devices or products, except the PSN is implemented electronically, rather than being placed on the exterior of the product. Another example of a PC signature for a computer that has Ethernet interface standard equipment is a unique ID called a "MAC address" and every piece of Ethernet hardware ever manufactured has been assigned one under the supervision of a standards organization.

At step 410, if the signatures are not identical, then at step 420, the software module displays an appropriate message to the user and does not print the requested digital postage stamp. If the signatures are identical, then at step 430, the software module generates the digital postage stamp using the stamp data, user data and server data that stored within the software module. A more complete description of the stamp data, user data and server data is provided below. At step 440, the software module initiates the printing of the digital postage stamp on a printer coupled to the PC. At step 450, the software module prevents duplicate printing of a digital postage stamp by making the data used in generating the digital postage stamps that is being printed, i.e., the stamp data, user data and server data, unusable for subsequent generations of digital postage stamps. At step 460, the software module determines if all postage stamps in the digital postage stamps have been printed. If all stamps have been printed, then at step 470, the software module notifies the user and uninstalls itself from the PC hard drive. If all stamps in the book have not been printed, the method returns to step 400 to enable generation of another digital postage stamp.

Figure 5:
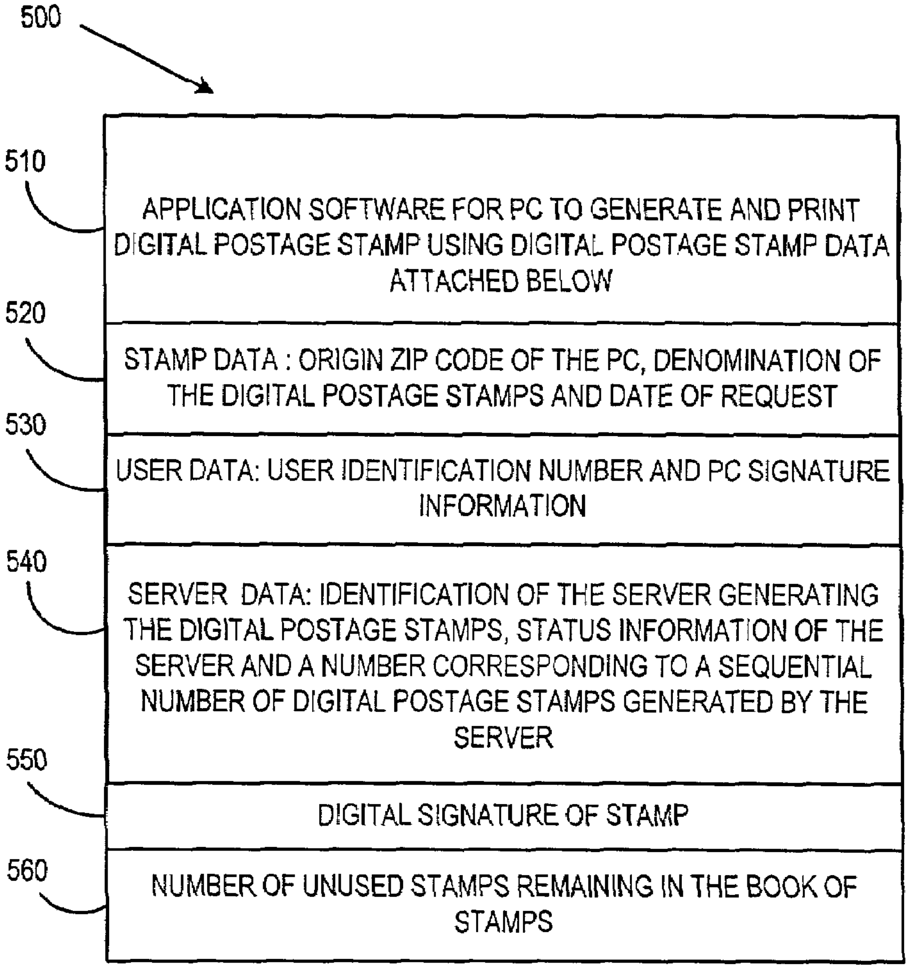
FIG. 5 is a block diagram representative of a digital book of postage stamps.

Referring now to FIG. 5, a block diagram representative of a digital book of postage stamps is shown. The digital book of postage stamps comprises a software module, generally designated 500, which includes application software 510 that runs in only one PC to generate and print digital postage stamps using digital postage stamp data files stored within software module 500. For each digital postage stamp in the digital book of postage stamps, a digital postage stamp data file includes: stamp data 520, such as origin zip code of the PC, denomination of the digital postage stamp and date of request; user data 530, such as user identification number and PC signature information; server data 540, such as identification of the server that generated software module 500, status information of the server and a number corresponding to this postage stamp's sequential number of digital postage stamps generated by the server; and a digital signature of the postage stamp 550. The digital signature of the postage stamp is generated at the data center using a cryptographic key to sign at least some of the postage stamp data 520-550. Preferably a private key of a public key pair, for example as used in the RSA public key algorithm. Finally, software module includes a number 560 that represents the number of unused stamps remaining in the book of stamps. This number 560 is decremented by software module 500 each time a stamp is printed by the software module.

Figure 6:
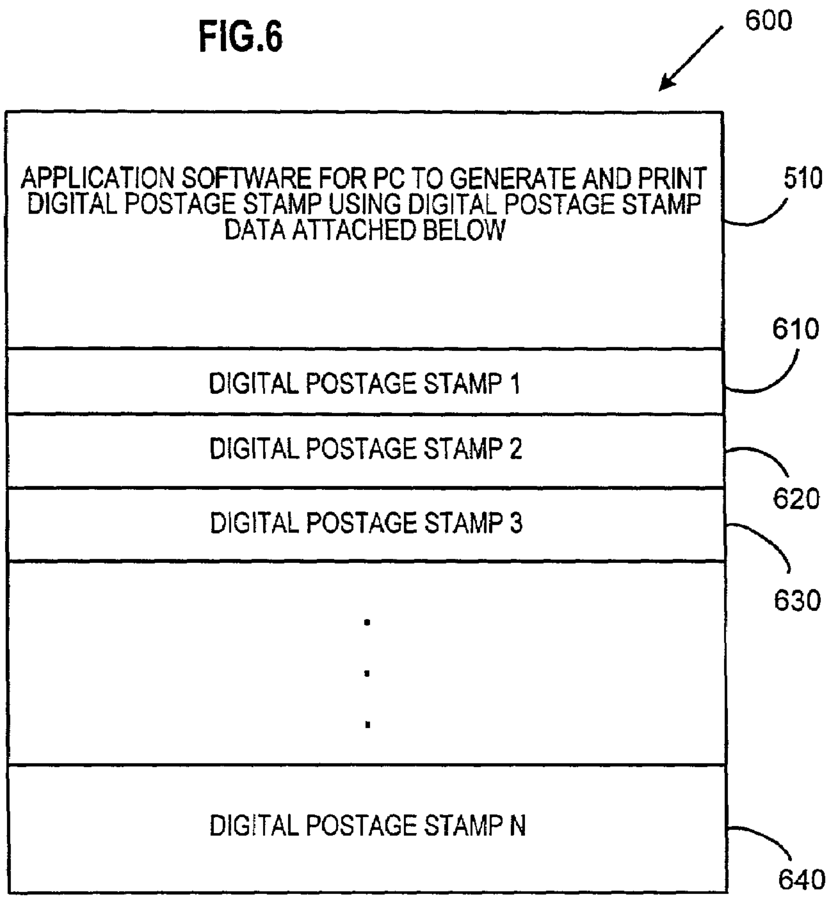
FIG. 6 is a block diagram representative of an alternative to the digital book of postage stamps of FIG. 5.

Referring now to FIG. 6, an alternative configuration of the digital book of postage stamps is shown. The digital book of postage stamps comprises a software module, generally designated 600, which includes application software 510 that runs in the PC to generate and print digital the graphical images 610-640 of the postage stamps as stored in the software module.

Figure 7:
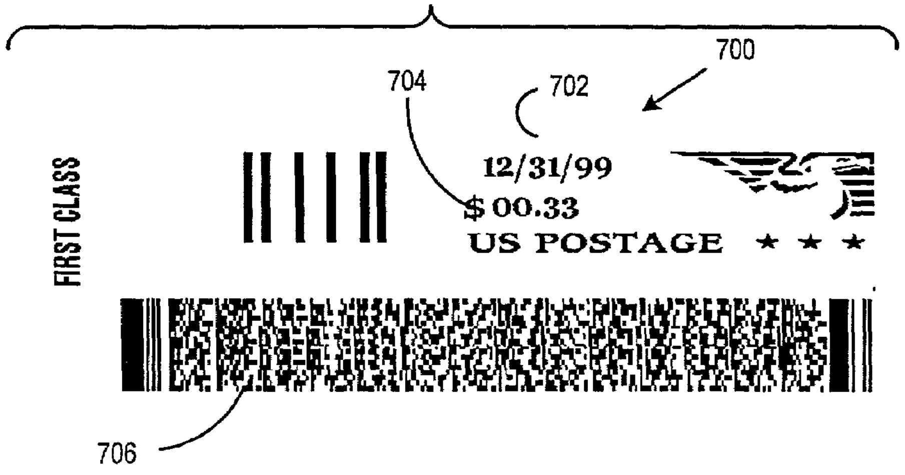
FIG. 7 is representation of a digital postage stamp.

Referring now to FIG. 7 a representative digital postage stamp 700 is shown. It can be seen that the digital postage stamp 700 includes a 2-D bar code 706, which is an encoded representation of the digital postage stamp data that was stored within software module 500 for stamp 700. The only human readable information shown in stamp 700 is the date of printing 702, the value 704 of stamp 700 and the identification that the postage is First Class U.S. postage.

Thus far, the present invention has been described with two levels of security. The first level of security is achieved by generating the software module to execute only on the requesting PC, i.e. the designated PC. This prevents copies being made for use on other PC's, which eliminates multiple copies of one digital book of postage stamps from being used on multiple PC's. The second level of security is achieved by having the software module destroy the stamp information needed for the module to generate the graphical image of each digital postage stamp when the digital postage stamp is printed. For the alternative embodiment, the software module destroys the graphical image that was prestored when the module was created. This prevents the designated PC printing multiple copies of each digital postage stamp.

Further levels of security can be added to prevent any tampering by hackers. For example, the digital stamp software module is a read only module which includes self-detection of tampering whereby any changes to the module by external sources results in the module becoming inoperative and an alert message to the user that the unused portion of the book of stamps has been lost. Additionally, the software module can be saved on the hard drive of the PC as a hidden file to make it more difficult for the typical PC user to locate on the hard drive.

A conventional password scheme may be used to prevent unauthorized access to the digital book of stamps. This provides security to user by preventing others using the PC from printing postage unless they know the user's password. This password may be provided to the data center when the request for the digital book of postage stamps is made, so that the password is embedded within the software module. Alternatively, the password can be established the first time the user prints a digital postage stamp.

As with other digital printing of postage evidencing, the present invention is suitable for printing messages, such as ad slogans, with the digital postage stamps. The user can select one or more messages when the user connects to the data center web page for purchasing the digital books of postage stamps. The messages may be an optional value added feature offered with the digital book of postage stamps. If selected, a message is stored as part of the software module whereby the message. As an incentive for printing a message sponsored by another party, i.e., an ad slogan, the cost of purchasing the digital book of postage stamps may be subsidized by the third party. See for example, U.S. Pat. Nos. 4,831,554 and 5,509,109 and U.S. patent applications Ser. Nos. 09/224,256, now U.S. Pat. No. 6,141,654, and Ser. No. 09/224,238, now U.S. Pat. No. 6,408,286. Alternatively, the user may initiate the message from the user's PC and request that the data center add the message to the software module for printing with each digital postage stamp.

As with any method for printing postage indicia, a verification process necessary to prevent fraudulent printing or copying of the indicia. In the present invention, the verification process can be a simple as verifying the digital signature of the stamp as printed in the 2-D bar code. This level of verification authenticates the digital postage stamp as a valid stamp generated by an authorized data center. A further level of verification is desired to detect for duplicates. The greatest risk with any digitally printed indicia that is printed by a non-dedicated printer or by a dedicated printer with off-the-shelf ink, for example not having florescent characteristics that are required for conventional electronic postage meter indicia. Any digitally printed indicium that is printed with ordinary ink is subject to duplicate fraud. For example, a valid indicium may be scanned into a computer and saved as a bitmap image that can later be used to print duplicate images of the indicium on other mailpieces.

One way of detecting such duplication fraud is to audit the information contained within the digital postage stamp to verify that the stamp is being audited for only one time. Such an audit can be achieved by maintaining a database of all digital postage stamps audited for a period, such as a month. This audit process can be made more reliable by placing a time limit that the digital postage stamps may be printed. The time limit may be in the form of a date range, for example two weeks from the time of purchase, so that the period for maintaining the database is reliably reasonable. Another method for auditing for duplicates is to maintain a list of generated digital postage stamps by server. When a digital postage stamp is audited, the audit process compares the audited stamp to the list of stamps to verify that the stamp has not been audited more than once. Preferably, the comparison is limited to the sequential number of the digital postage stamp by server.

The preferred location for performing the audit is the mail induction point, i.e., where the mail enters the postal processing. For the sake of efficiency, the verification of the authenticity of the digital postage stamp can also take place at the induction point. Preferably, one scan can be used to both authenticate the digital postage stamp and audit for duplicates. The authenticity of the digital postage stamp is verified by verifying the digital signature contained within the 2-D bar code using known verification schemes.

Finally, the verification process can be simplified by adding additional information to the mailpiece when the digital postage stamp is printed. For example, addressee information, such as destination postal code, can be entered by the user requesting the printing of the stamp. In accordance with the present invention, the software module, in addition to printing the digital postage stamp in step 440 of FIG. 4, signs or encrypts the concatenation of the postage stamps digital signature and the addressee information using a key stored within the software module to produce a second digital signature. For the preferred embodiment in which the software module generates the digital postage stamp in the PC, the software module can incorporate the second digital signature into the 2-D bar code portion of the digital postage stamp and include the addressee information in plain text on the mailpiece, e.g., next to the digital postage stamp or as part of the digital postage stamp. In the alternative embodiment in which the digital postage stamp was generated at the data center and the software module merely prints the digital postage stamp, the software module prints the plain text and the signature or encryption thereof at some predetermined location on the mailpiece, such as next to the digital postage stamp. It will be understood that the addressee information and the signature or encryption thereof may be printed in a bar code instead. In this manner, once the digital postage stamp is authenticated, the verification process verifies that the signature/encryption of the addressee information corresponds the addressee information in plain text. Adding such addressee information to the verification process reduces the need to check for duplicate printing of the digital postage stamp.

While the present invention has been disclosed and described with reference to a single embodiment thereof, it will be apparent, as noted above that variations and modifications may be made therein. It is also noted that the present invention is independent of the machine being controlled, and is not limited to the control of inserting machines. It is, thus, intended in the following claims to cover each variation and modification that falls within the true spirit and scope of the present invention.

Pentium® is a trademark of Intel Corporation

What is claimed is:

1. A data center for providing evidence of postage payment comprising:

means for receiving a request for evidence of postage payment from a remote computer via a network;

means for generating a digital book of postage stamps for use in evidencing postage payment, the digital book of postage stamps comprising a software module that prints each digital postage stamp in the digital book of postage stamps using stamp related information contained within the software module; and means for sending the digital book of postage stamps to the remote computer via the network.

2. The data center according to claim 1, wherein the stamp related information comprises first data which is required for each postage stamp, second data which identifies the remote computer, third data which is unique to each digital postage stamp, and a first digital signature of at least some of the first, second and third data.

3. The data center according to claim 2, wherein the first data includes origin zip code of the remote computer, denomination of the digital postage stamp and date of request, the second data includes a user identification number and remote computer signature information, and the third data includes identification of the data center generating the digital postage stamps, status information of the data center and a number corresponding to a sequential number of digital postage stamps generated by the data center.

4. The data center according to claim 1, wherein the network is the Internet.

5. The data center according to claim 1, wherein the data center conducts a payment transaction for the digital book of postage stamps.

6. A system for printing digital postage stamps comprising:

a remote computer coupled to a network, the remote computer sending a request for a selected number of digital postage stamps via the network; and a data center coupled to the network, the data center receiving the request for the selected number of digital postage stamps, the data center comprising:

means for generating a digital book of postage stamps, the digital book of postage stamps comprising a software module that prints each digital postage stamp using stamp related information contained within the software module; and means for sending the digital book of postage stamp to the remote computer via the network.

7. The system according to claim 6, wherein the stamp related information comprises first data which is required for each postage stamp, second data which identifies the remote computer, third data which is unique to each digital postage stamp, and a first digital signature of at least some of the first, second and third data.

8. The system according to claim 7, wherein the first data includes origin zip code of the remote computer, denomination of the digital postage stamp and date of request, the second data includes a user identification number and remote computer signature information, and the third data includes identification of the data center generating the digital postage stamps, status information of the data center and a number corresponding to a sequential number of digital postage stamps generated by the data center.

9. The system according to claim 6, wherein the network is the Internet.

10. The system according to claim 6, wherein the request for the selected number of digital postage stamps includes payment information needed to conclude payment for the selected number of digital postage stamps.

11. The system according to claim 6, wherein the software module is executable only on the remote computer that sent the request.

12. The system according to claim 6, wherein a graphical image of each digital stamp in the digital book of postage stamps is included in the software module.

13. The system according to claim 6, wherein information needed for the software module to generate a graphical image of a digital stamp in the digital book of postage stamps is stored in the remote computer.

14. The system according to claim 6, wherein the software module destroys the stamp related information contained within the software module for each respective digital postage stamp when each respective digital postage stamp is printed.

15. The system according to claim 6, further comprising:

a verification system to verify a mailpiece on which a digital postage stamp from the digital book of postage stamps is printed as evidence of postage payment.

16. The system according to claim 15, wherein the verification system verifies a digital signature of the digital postage stamp, the digital signature being generated at the data center using a cryptographic key to sign at least some of the stamp related information.

17. A method for evidencing postage on a mailpiece comprising the steps of:

establishing a communication between a remote computer and a data center server;

sending a request for a selected number of digital postage stamps from the remote computer to the data center;

receiving, at the remote computer, a digital book of postage stamps generated by the data center server, the digital book of postage stamps comprising a software module that prints each digital book of postage stamps using stamp related information contained within the software module; and running the software module to generate and print a digital postage stamp from the digital book of postage stamps on the mailpiece to evidence postage.

18. The method according to claim 17, further comprising:

storing the software module in a memory of the remote computer.

19. The method according to claim 18, further comprising:

uninstalling the software module from the memory when all digital postage stamps in the digital book of postage stamps have been printed.

20. The method according to claim 17, wherein the step of establishing a communication further comprises:

establishing a communication via the Internet.

* * * * *